(12) United States Patent
Bostick et al.

(10) Patent No.: US 9,984,173 B2
(45) Date of Patent: May 29, 2018

(54) AUTOMATED VALUE ANALYSIS IN LEGACY DATA

(71) Applicant: International Business Machines Corporation, Armonk, NY (US)

(72) Inventors: James E. Bostick, Cedar Park, TX (US); John M. Ganci, Jr., Cary, MN (US); Arvind Singh, Pleasant Prairie, WI (US); David S. Wenk, Grand Rapids, MI (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 341 days.

(21) Appl. No.: 14/188,137

(22) Filed: Feb. 24, 2014

(65) Prior Publication Data

US 2015/0242524 A1    Aug. 27, 2015

(51) Int. Cl.
G06F 17/30    (2006.01)

(52) U.S. Cl.
CPC .......................... G06F 17/30893 (2013.01)

(58) Field of Classification Search
CPC ............................................ G06F 17/30893
USPC .................................................... 707/694
See application file for complete search history.

(56) References Cited

U.S. PATENT DOCUMENTS

| | | | | |
|---|---|---|---|---|
| 6,041,330 A * | 3/2000 | Carman | ..................... | G06F 8/78 |
| 6,088,707 A | 7/2000 | Bates | | |
| 6,678,691 B1 * | 1/2004 | Kikkers | ............ | G06F 17/30569 |
| | | | | 707/602 |
| 7,565,349 B2 * | 7/2009 | Beckerle | ........... | G06F 17/30575 |
| 7,818,665 B1 * | 10/2010 | Russin | ................ | G06F 17/2247 |
| | | | | 715/236 |
| 8,307,012 B2 * | 11/2012 | Thomas | ............ | G06F 17/30294 |
| | | | | 707/803 |
| 8,645,434 B2 * | 2/2014 | Carter | ............... | G06F 17/30292 |
| | | | | 707/804 |
| 8,793,567 B2 * | 7/2014 | Velingkar | ......... | G06F 17/30286 |
| | | | | 715/220 |

(Continued)

FOREIGN PATENT DOCUMENTS

WO    1999052047 A1    10/1999

OTHER PUBLICATIONS

Anonymous, A System and Method for Providing Meta-data Model Based Distributed Data Validation, Feb. 3, 2012.

(Continued)

*Primary Examiner* — Miranda Le
(74) *Attorney, Agent, or Firm* — Garg Law Firm, PLLC; Rakesh Garg; Christopher K. McLar

(57) ABSTRACT

A method, system, and computer program product for automated value analysis in legacy data are provided in the illustrative embodiments. A first number of occurrences of a first value in a first field is counted in the legacy data. A first identifier associated with the first field, the first value, and the first count are recorded as a first entry in a value data structure, the value data structure comprising a set of entries. The value data structure is analyzed to determine an aberration between the first count and a second count, wherein the second count corresponds to a second number of occurrences of a second value in the first field. The aberration at the first field of the legacy data is reported in a report.

14 Claims, 8 Drawing Sheets

(56) References Cited

U.S. PATENT DOCUMENTS

| | | | | |
|---|---|---|---|---|
| 8,832,020 B2* | 9/2014 | Landy | | G06F 17/30563 707/602 |
| 8,832,157 B1* | 9/2014 | Shatdal | | G06F 17/30469 707/802 |
| 8,868,580 B2* | 10/2014 | Gould | | G06F 17/30466 707/758 |
| 8,977,705 B2* | 3/2015 | Smith | | G06F 21/552 709/203 |
| 9,311,371 B2* | 4/2016 | Mohan | | G06F 17/246 |
| 2003/0229617 A1* | 12/2003 | Rjaibi | | G06F 17/30469 |
| 2007/0288942 A1* | 12/2007 | Cahill | | G06F 17/30569 719/329 |
| 2008/0306986 A1* | 12/2008 | Doyle, Sr. | | G06Q 10/10 |
| 2009/0164984 A1 | 6/2009 | Woods | | |
| 2009/0319505 A1* | 12/2009 | Li | | G06F 17/2765 |
| 2011/0218980 A1* | 9/2011 | Assadi | | G06F 17/30 707/700 |
| 2011/0295904 A1* | 12/2011 | Mohan | | G06F 17/30569 707/802 |
| 2014/0114926 A1* | 4/2014 | Anderson | | G06F 17/30 707/687 |
| 2014/0115013 A1* | 4/2014 | Anderson | | G06F 17/30303 707/812 |
| 2014/0156591 A1* | 6/2014 | Sukumar | | G06F 17/30563 707/602 |

OTHER PUBLICATIONS

Anonymous, Method and System for Automatically Determining Hierarchies/Relationships from a Data Set for Generating Data Model, Dec. 15, 2010.

IBM, Using Multiple Columns to Represent Aggregated Data Alongside Redundant Data, Feb. 8, 2007.

DB2 10.5 for Linux, UNIX, and Windows, Catalog statistics tables, http://pic.dhe.ibm.com/infocenter/db2luw/v10r5/index.jsp?topic=%2Fcom.ibm.db2.luw.admin.perf.doc%2Fdoc%2Fc0005087.html, 2014.

DB2 10.5 for Linux, UNIX, and Windows, Collecting distribution statistics for specific columns, http://publib.boulder.ibm.com/infocenter/db2luw/v10r5/index.jsp?topic=%2Fcom.ibm.db2.luw.admin.perf.doc%2Fdoc%2Ft0005073.html, 2014.

IBM InfoSphere Foundation Tools, IBM InfoSphere Information Server, Data profiling and analysis, Version 8.5, http://pic.dhe.ibm.com/infocenter/iisinfsv/v8r5/index.jsp?topic=%2Fcom.ibm.swg.im.iis.productization.iisinfsv.overview.doc%2Ftopics%2Fcisoiausingprofile.html, 2014.

Smith, IBM DB2 RUNSTATS Utility and Real-Time Statistics, Session 1316, Tuesday, Aug. 14, 2007.

microsoft.com, Data Profiling Task, http://technet.microsoft.com/en-us/library/bb895263(d=printer).aspx, SQL Server 2012.

Gorelik, IBM InfoSphere Discovery: The next generation of data analysis, Jun. 29, 2010 (First published Jun. 17, 2010).

* cited by examiner

*FIG. 1A*

DATA ANALYSIS SUMMARY FOR TABLE XYZ

| FIELD NAME | TOTAL RECORDS | UNIQUE COUNT | BLANKS | ZEROES | ALPHANUMERIC | NUMERIC (+) | NUMERIC (-) | IS DATE |
|---|---|---|---|---|---|---|---|---|
| FIELD 1 | 2,472,884 | 1 | 2,472,884 | | | | | |
| FIELD 2 | 2,472,884 | 1,800,000 | 472,084 | | 2,000,000 | | | |
| FIELD 3 | 2,472,884 | 2,200,000 | | | | 2,472,884 | | |
| FIELD 4 | 2,472,884 | 2 | 2,472,883 | | 1 | | | |
| FIELD 5 | 2,472,884 | 1,678,223 | | 500,000 | | 1,472,884 | 500,000 | |
| FIELD 6 | 2,472,884 | 1 | | 2,472,884 | | | | |
| FIELD 7 | 2,472,884 | 1 | | | | | | 2,472,884 |

150

AUTOMATED VALUE ANALYSIS IN LEGACY DATA

TECHNICAL FIELD

The present invention relates generally to a method, system, and computer program product for modernizing legacy data, including understanding the legacy data and determining irregularities in the legacy data. More particularly, the present invention relates to a method, system, and computer program product for automated value analysis in legacy data.

BACKGROUND

Legacy data is data that has been created using an outdated or proprietary system, is in an outdated or proprietary format, or is in need of migration to a different system or form, or a combination thereof. Many organizations continue to use systems that no longer meet the organization's needs, have become obsolete, or both. Such systems are generally referred to as legacy systems.

Legacy data generally results from legacy systems, but there are instances where legacy data has prevailed in a data processing environment even after the data processing systems have been modernized or migrated. Migrating legacy data is the process of moving the legacy data from an old form or structure (collectively, legacy form) to a new form or structure (collectively, modern form). The modern form is selected to be more efficient that the legacy form, to have better compatibility with the modernized systems, to offer improved scalability for future data growth, to provide better security and reliability, or a combination thereof.

SUMMARY

The illustrative embodiments provide a method, system, and computer program product for automated value analysis in legacy data. An embodiment An embodiment includes a method for automated value analysis in legacy data. The embodiment counts a first number of occurrences of a first value in a first field in the legacy data. The embodiment records, as a first entry in a value data structure, a first identifier associated with the first field, the first value, and the first count, the value data structure comprising a set of entries. The embodiment analyzes, using a processor and a memory, the value data structure to determine an aberration between the first count and a second count, wherein the second count corresponds to a second number of occurrences of a second value in the first field. The embodiment reports the aberration at the first field of the legacy data in a report.

Another embodiment includes a computer program product for automated value analysis in legacy data. The embodiment further includes one or more computer-readable tangible storage devices. The embodiment further includes program instructions, stored on at least one of the one or more storage devices, to count a first number of occurrences of a first value in a first field in the legacy data. The embodiment further includes program instructions, stored on at least one of the one or more storage devices, to record, as a first entry in a value data structure, a first identifier associated with the first field, the first value, and the first count, the value data structure comprising a set of entries. The embodiment further includes program instructions, stored on at least one of the one or more storage devices, to analyze, using a processor and a memory, the value data structure to determine an aberration between the first count and a second count, wherein the second count corresponds to a second number of occurrences of a second value in the first field. The embodiment further includes program instructions, stored on at least one of the one or more storage devices, to report the aberration at the first field of the legacy data in a report.

Another embodiment includes a computer system for automated value analysis in legacy data. The embodiment further includes one or more processors, one or more computer-readable memories and one or more computer-readable tangible storage devices. The embodiment further includes program instructions, stored on at least one of the one or more storage devices for execution by at least one of the one or more processors via at least one of the one or more memories, to count a first number of occurrences of a first value in a first field in the legacy data. The embodiment further includes program instructions, stored on at least one of the one or more storage devices for execution by at least one of the one or more processors via at least one of the one or more memories, to record, as a first entry in a value data structure, a first identifier associated with the first field, the first value, and the first count, the value data structure comprising a set of entries. The embodiment further includes program instructions, stored on at least one of the one or more storage devices for execution by at least one of the one or more processors via at least one of the one or more memories, to analyze, using a processor and a memory, the value data structure to determine an aberration between the first count and a second count, wherein the second count corresponds to a second number of occurrences of a second value in the first field. The embodiment further includes program instructions, stored on at least one of the one or more storage devices for execution by at least one of the one or more processors via at least one of the one or more memories, to report the aberration at the first field of the legacy data in a report.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 1A depicts an example value data structure according to an illustrative embodiment;

DETAILED DESCRIPTION

Figure 1B:
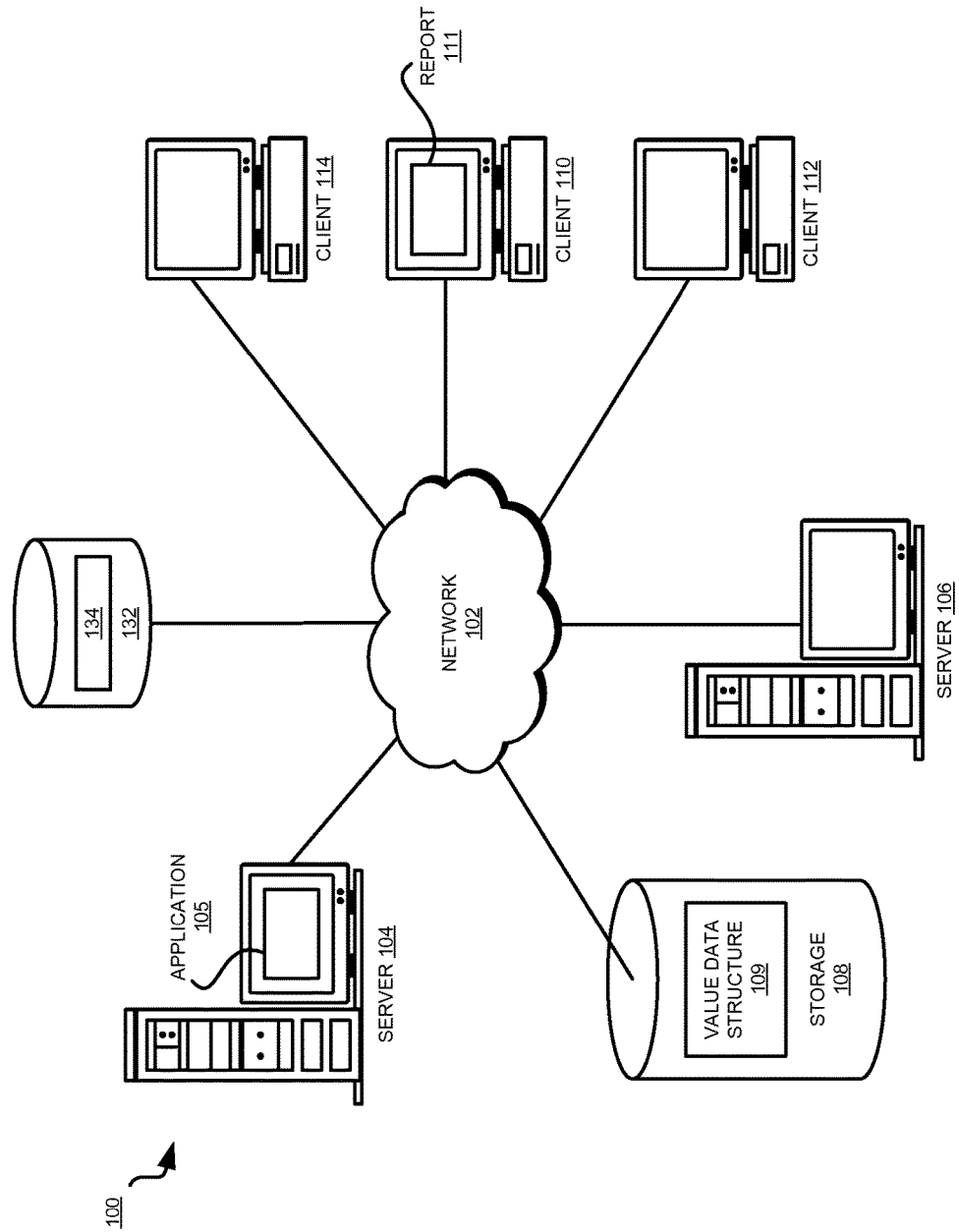
FIG. 1B depicts a block diagram of a network of data processing systems in which illustrative embodiments may be implemented.

The legacy data in the legacy form can be structured data or unstructured data. Structured data is data that is organized in a defined data structure, such as in one or more tables having columns or dimensions. Unstructured data is data that is free-form, or is treated as free-form due to a lack of apparent or described structure.

A value is a data item present in data. For example, if the data comprises a table, a cell in the table forms a value that is defined by the row and column in which the value appears. If the data is unstructured, such as a document, a word, phrase, or string in the document forms a value, and is defined by a relative location where the value appears with respect to other values in the document.

During legacy data migration, it is not uncommon for a migration team to struggle with understanding the structure, form, position, dependencies, relationships, formats, use, and function of the various values present in the legacy data. Often, migration teams discover that the documentation of the legacy form, which could help with such understanding, has either been lost, not kept current, inconsistently modified, or has been abandoned as legacy data collected and grew over time.

For example, assume that once upon a time when a structure was defined for a given legacy data, a table column was designated to hold a phone number. At the time of migration, a migration team might discover values in that column that are alphanumeric and of various lengths. The migration team then has to painstakingly analyze the alphanumeric strings to find out what they represent, as they are clearly not phone numbers.

The illustrative embodiments recognize that for these and other reasons, ascertaining a meaning of many values in legacy data is presently largely a manual and cumbersome task. The above example illustrates an overly simplified version of a much more complex value analysis problem. Legacy data in some data processing environments can be of the order of gigabytes, terabytes, or petabytes, and can span tens of thousands of tables, documents, or graphs, and millions of rows, columns, nodes, delimiters, documents, and the like.

Therefore, the illustrative embodiments recognize that value analysis in legacy data is therefore a complex, time-consuming, and error-introducing problem. An automated method for value analysis in legacy data is therefore desirable.

The illustrative embodiments used to describe the invention generally address and solve the above-described problems and other problems related to the understanding legacy data. The illustrative embodiments provide a method, system, and computer program product for automated value analysis in legacy data.

An embodiment reads legacy data and loads a transformation of the legacy data into a value data structure. In one example embodiment, the value data structure comprises a suitable representation of a {field name, value, count} triple. A "triple" is a combination of these three pieces of information. The "field name" in the triple identifies a location, e.g., a column in a table, where a particular value is found in the legacy data. The "value" is the contents of that location, e.g., a number, string, null, or something else. The "count" is the unique count of values in that field. For example, if a table column has ten cells underneath, and all ten cells have the same value "0", the count, or unique count, of the values in that table column is 1. As another example, if some cells had the value "0" and remainder cells had the value "1", the unique count of values in that table column would be 2. Likewise, if all cells had distinct values in that table column, the unique count would be 10.

For example, consider table 150 in FIG. 1A. Assume that an example table XYZ in a given legacy data includes seven columns "Field 1," "Field 2," "Field 3," "Field 4," "Field 5," "Field 6," and "Field 7." Further assume that the example legacy table includes two million four hundred seventy two thousand eight hundred and eighty four (2,472,884) rows.

Value data structure 150 shows that Field 1 has 2,472,884 records, all records having the same value—blanks, hence the count of 1. Similarly, value data structure 150 shows that Field 2 has 2,472,884 records, having 1,800,000 different unique values amongst those records, hence the count of 1,800,000. Value data structure 150 further shows that Field 2 has blanks (one of the 1,800,000 unique values) in 472,884 records, and 2,000,000 alphanumeric values (of which 1,799,999 are distinct, and the remaining 200,001 are one or more repetitions of one or more values from those 1,799,999 distinct or unique values). Other rows of value data structure 150 pertain to the remaining Fields 3-7 of the example legacy table, and describe the legacy data in those fields of the legacy table in a similar manner.

Thus an embodiment transforms the given legacy data into a value data structure, as described in the above example. An embodiment further analyzes the value data structure to detect re-purposed or misused fields, blank or available fields, erroneous or unintentional data in some fields, or a combination thereof.

The embodiment employs a combination of rules and templates to determine the nature of the value in a given triple. A rule is any manifestation of logic to check for one or more conditions and to produce an output according to an outcome of those one or more conditions. The rule can take the form of computer code, pseudo-code, a heuristic, a logical expression, a policy, a statement, or any other suitable form for a similar purpose.

A template is a definition of a format. If a value matches a template, the embodiment concludes that the value is likely of the type represented by that template. For example, a date template can be MMDDYY, YYYYMMDD, DDM-MMYYYY, or another suitable manifestation of commonly understood date formats. Numeric data matching the format is therefore reasonably construed as a date. Furthermore, a template can be used in conjunction with a rule. For example, if a numeric value is six digits in length where the middle two digits never exceed "12", the embodiment can conclude that the value is likely a date.

Now consider the example analysis of value data structure 150 according to an embodiment. For example, the embodiment analyzes value data structure 150, and determines according to an example rule that because all values are blanks in Field 1 of table XYZ, Field 1 is an unused field. Similarly, the embodiment analyzes value data structure 150 to determine according to another example rule that because a larger than a threshold number of values are distinct in Field 2 of table XYZ, Field 2 is possibly being used to store keys to access other legacy data.

Similarly, the embodiment analyzes value data structure 150 according to another example rule. Looking at Field 4 triple in table 150, the embodiment determines that 2,472,883 records out of 2,472,884 records are blanks and one record has an alphanumeric value (hence the unique count of 2). The embodiment concludes that because less than a threshold number of records (1) in Field 4 have a unique value (alphanumeric), of table XYZ, the record with that unique value in Field 4 is possibly storing corrupted, erroneous, or unintended data.

Similarly, the embodiment analyzes value data structure 150 according to another example rule. Looking at Field 5 triple in table 150, the embodiment determines that greater than threshold number of records have different or unique values. Furthermore, those unique values include zeros, and several positive and negative numbers. Assume that Field 5 of table XYZ was labeled or identified to store phone numbers in a legacy data schema. The embodiment concludes that because of the zero values and the negative values, Field 5 is not being used as planned, but is possibly re-purposed to store other data, e.g., accounting data.

Analyzing in this manner, an embodiment identifies aberrant values, fields or positions, counts, and optionally a reason for the aberration in a report. Any size and type of legacy data can be transformed and loaded into a value data structure, analyzed, and reported by one or more embodiments in a similar manner.

The illustrative embodiments are described with respect to certain data, forms of data, rules, formats, counts, triples, structures, data processing systems, environments, components, and applications only as examples. Any specific manifestations of such artifacts are not intended to be limiting to the invention. Any suitable manifestation of data processing systems, environments, components, and applications can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
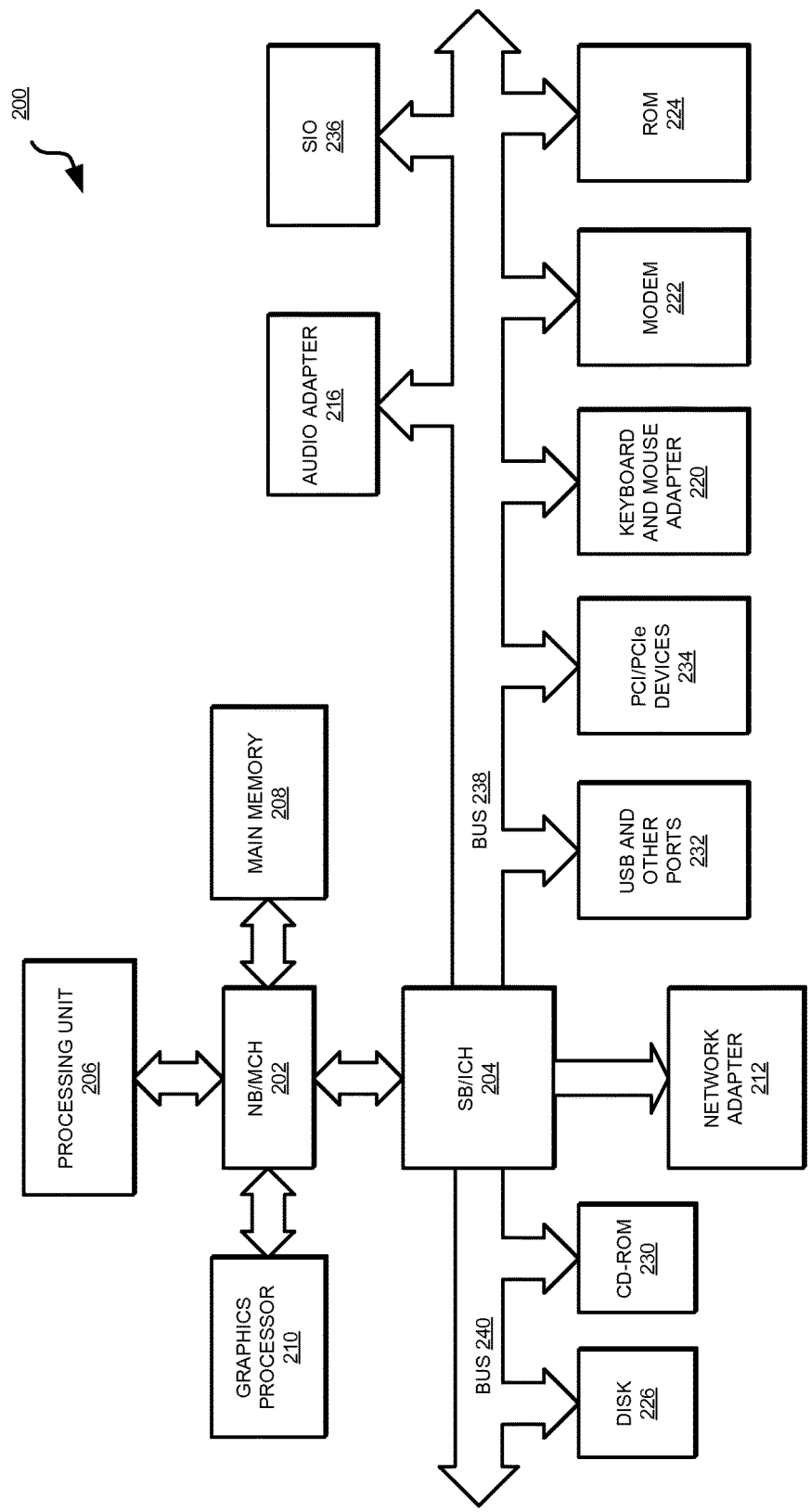
FIG. 2 depicts a block diagram of a data processing system in which illustrative embodiments may be implemented

With reference to the figures and in particular with reference to FIGS. 1B and 2, these figures are example diagrams of data processing environments in which illustrative embodiments may be implemented. FIGS. 1B and 2 are only examples and are not intended to assert or imply any limitation with regard to the environments in which different embodiments may be implemented. A particular implementation may make many modifications to the depicted environments based on the following description.

FIG. 1B depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Only as an example, and without implying any limitation to such architecture, FIG. 1B depicts certain components that are useable in an embodiment. For example, Application 105 in server 104 implements an embodiment described herein. Value data structure 109 in storage 108 is any suitable structure, not limited to a table or tabular data structure, to store transformed legacy data as described with respect to an embodiment herein. Report 111 is a report generated from the analysis performed by an embodiment. Report 111 can take any suitable form within the scope of the illustrative embodiments. Data source 132 comprises any number of data sources that are accessible over network 102 and provide legacy data 134 to application 105. In one embodiment, data source 132 is an example of a local data source, for example, accessible over a bus or a local area network. In another embodiment, data source 132 is an example of an external data source, for example, accessible over a wide area network.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1B is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 110 in FIG. 1B, or another type of device in which computer usable program code or instructions implementing the processes may be located for the illustrative embodiments.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 105 in FIG. 1B, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1B and 2 may vary depending on the implementation. Other internal hardware or peripheral devices, such as flash memory, equivalent non-volatile memory, or optical disk drives and the like, may be used in addition to or in place of the hardware depicted in FIGS. 1B and 2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1B and 2 and above-described examples are not meant to imply architectural limitations. For example, data processing system 200 also may be a tablet computer, laptop computer, or telephone device in addition to taking the form of a PDA.

Figure 3:
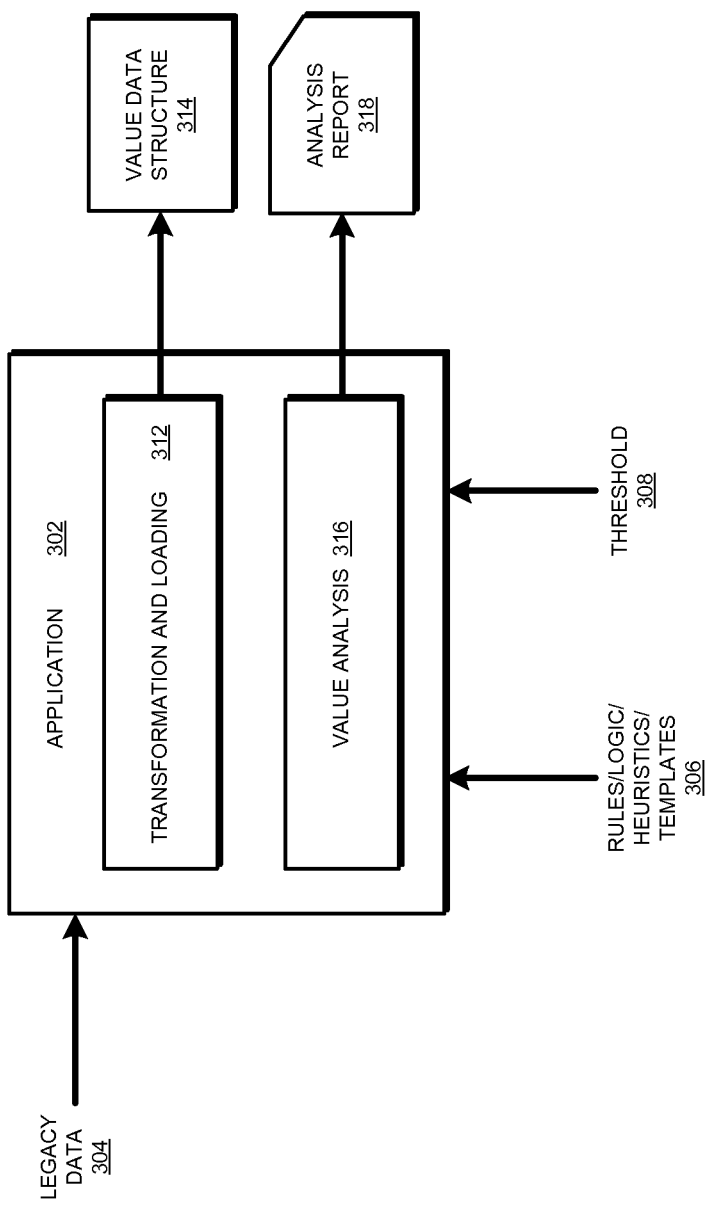
FIG. 3 depicts a block diagram of a configuration for automated value analysis in legacy data in accordance with an illustrative embodiment

With reference to FIG. 3, this figure depicts a block diagram of a configuration for automated value analysis in legacy data in accordance with an illustrative embodiment. Application 302 is an example of application 105 in FIG. 1B.

Application 302 receives as input legacy data 304. Rules and templates 306 and threshold 308 form other inputs to application 302. The rules in rules and templates 306 include logic or condition statements in any suitable form without limitation. The templates in rules and templates 306 can include any number and types of format templates as alternatives for a given value. Any number of templates for any number and types of values can similarly be provided as input 308 to application. A repository of any suitable kind can store and provide rules and templates 306 to input.

Component 312 performs the transformation and loading of legacy data 304 as described earlier with respect to FIG.

1A. Under certain circumstances, transforming and loading all of legacy data 304 may not be necessary. For example, according to one embodiment, component 312 recognizes during transformation and loading operation that all values being loaded for a certain field name or position have been distinct so far. A rule in input 306 may provide that when at least a threshold number of records include distinct values in a field or position, an assumption can be made that all records for that field will have distinct values.

Transforming and loading all or part of legacy data 304 in this manner, component 312 populates value data structure 314. Value data structure 314 remains accessible to application 302.

Component 316 performs value analysis on the contents of value data structure 314 in the manner described earlier with respect to value data structure 150 of FIG. 1A. For example, component 316 identifies a value that may be erroneous or corrupted in the legacy data, a field that may be unused in the legacy data, a field that may have been re-purposed in the legacy data or makes a combination of these and other value analyses.

Any number or types of value analyses are possible given the appropriate corresponding rule. For example, given a rule that distinguishes between two date formats, component 316 can identify a field in legacy data 304 where the values are in fact date data but in different formats. Such identification may be useful in a data migration exercise where the different formats may have to be processed differently, for example, as was the case with the Y2K problem. From this disclosure, such other possible value analyses will be conceivable by those of ordinary skill in the art, and the same are contemplated within the scope of the illustrative embodiments.

Component 316 outputs the results of value analyses in analysis report 318. In one embodiment, report 318 includes a field name, such as when legacy data 304 is structured or relational. In another embodiment, report 318 includes a position identifier, such as a node position or a location in a document, when legacy data 304 is unstructured, e.g., in the form of a graph or a document.

Report 316 can also include the values that occupy those field names or positions and are erroneous, incongruent with their location, unexpected, corrupted, or otherwise identified as a result of a rule or template. Optionally, report 318 can also include a reason for identifying the field, position, or value in the report. For example, a name or description of the rule or template that causes a field name to be identified in report can also be identified in the report to assist a user in addressing the reason for the identification.

Figure 4:
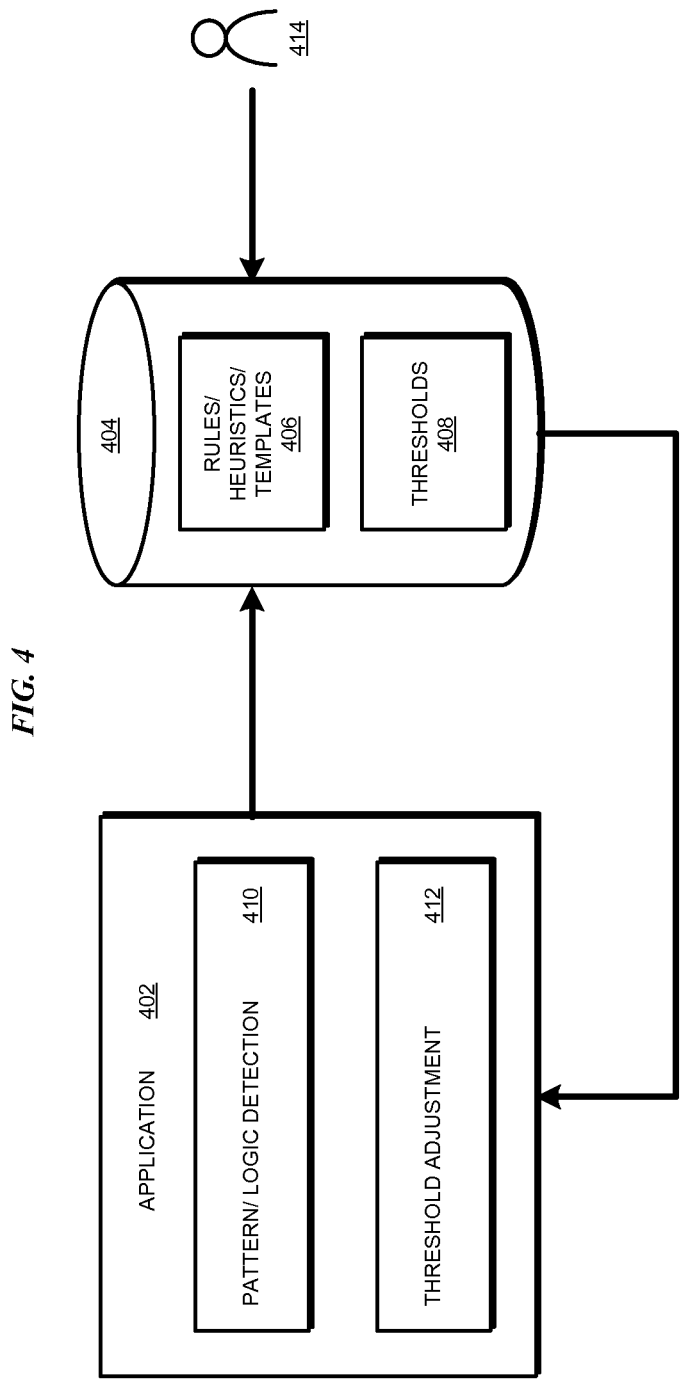
FIG. 4 depicts a configuration for improving automated value analysis in legacy data via machine learning in accordance with an illustrative embodiment

With reference to FIG. 4, this figure depicts a configuration for improving automated value analysis in legacy data via machine learning in accordance with an illustrative embodiment. Application 402 is an example of application 302 in FIG. 3.

Repository 404 stores collection 406 of rules, heuristics, and templates. Thresholds 408 are one or more threshold values of various types as described and used herein.

Collection 406 can be created and store a priori in repository 404 to address known situations that are to be expected in legacy data. Thresholds 408 are also created from prior experiences and educated estimation. For example, prior experience may inform that if a single record in a field has an aberrant value, a conclusion can be drawn that the field should be identified in an analysis report. However, observations during a migration project may find that sometimes aberrant values can span multiple records too, such as when cosmic phenomenon cause bit flips and other soft errors during a write operation.

Similarly, new data patterns to represent a type, form, or style of value may be present in a given legacy data and may not have been thought of when collection 406 was created. As another example, new relationships between fields may be discovered given certain legacy data, which may not have been envisioned a priori. For example, in a simplistic case, suppose that collection 406 includes rules and/or templates to identify a credit card number and a date. However, given particular legacy data, a relationship may become apparent that where there is a credit card number, an expiry date is also likely to be present, and the two should be related to one another in some manner in the data.

These are only some example situations to highlight the fact that not all rules, heuristics, and templates can be pre-thought, and discoveries of new patterns, relationships, and conditions can result in new or changed rules, heuristics, or templates. Similarly, one or more previously configured thresholds 408 may be changed, new thresholds defined as more legacy data is processed by application 402.

Components 410 and 412 are configured in application 402 in addition to components 312 and 316 depicted in FIG. 3. Component 410 is configured to detect patterns, logic, formats, and other data conditions in legacy data that do not correspond to rules, heuristics, or templates in collection 406. Component 410 outputs to repository 404 such data conditions or a description thereof.

Similarly, component 412 is configured to determine when a threshold from thresholds 408 is overly restrictive or resulting in excessive false positives. Component 412 also determines when new thresholds may have to be defined to address a new data condition encountered in given legacy data. Component 412 outputs such findings of new thresholds, or need for changing an existing threshold, to repository 402.

User 414 considers the data conditions or their description output from component 410, and threshold change information from component 412. User 414 or a system can then formulate new or changed rules, heuristics, templates, and thresholds to enrich collections 406 and 408. Application 402 uses enriched collections 406 and 408 on the same or different legacy data at a later time for improved automated value analysis in legacy data. Thus, a performance of application 402 is improved through machine learning, based on new observations in previous iterations of automated value analysis in legacy data.

Figure 5:
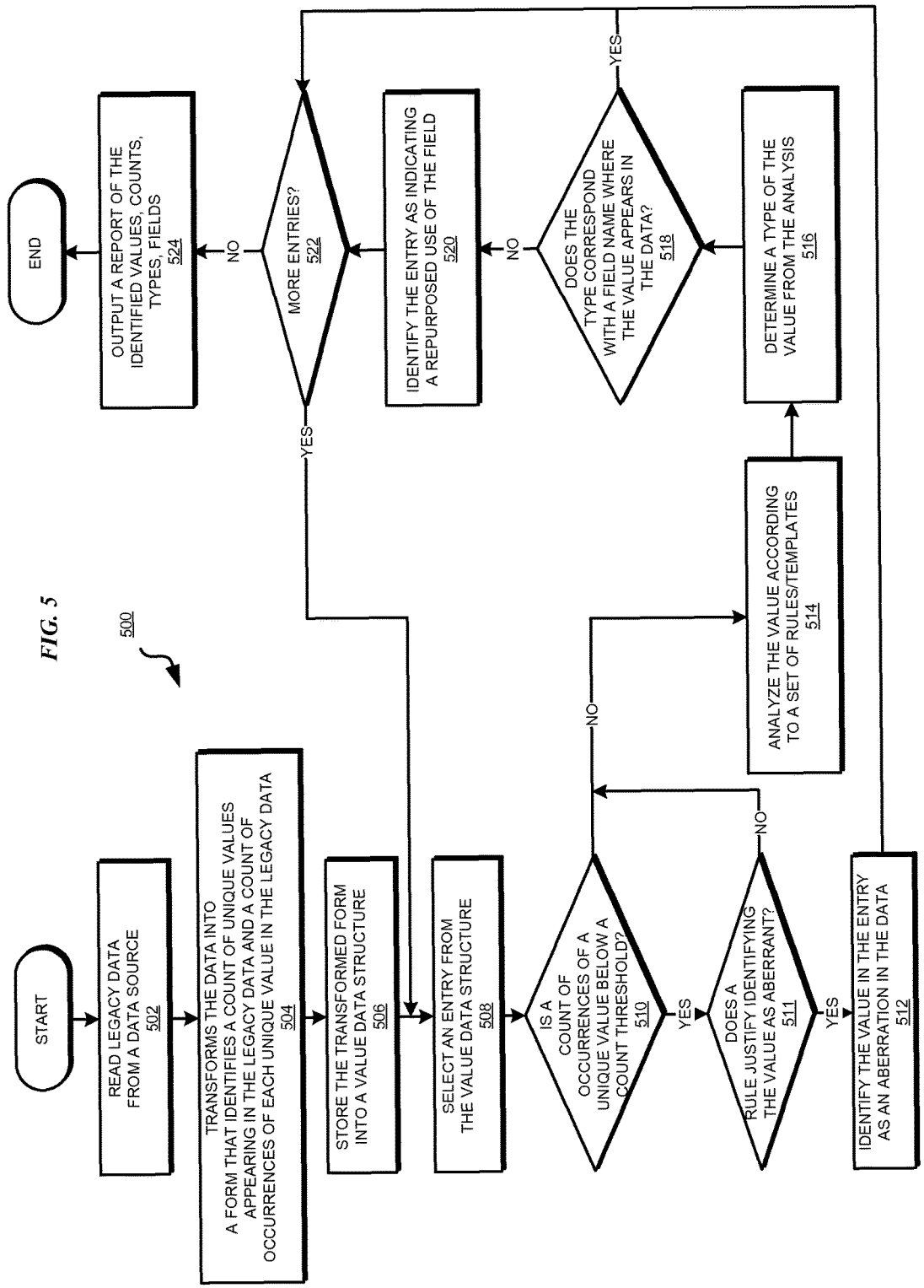
FIG. 5 depicts a flowchart of an example process for automated value analysis in legacy data in accordance with an illustrative embodiment

With reference to FIG. 5, this figure depicts a flowchart of an example process for automated value analysis in legacy data in accordance with an illustrative embodiment. Process 500 can be implemented in application 302 in FIG. 3 or application 402 in FIG. 4.

The application reads legacy data from a data source (block 502). The application transforms the legacy data, or a portion thereof, into a form that is suitable for identifying a count of unique values and a count of occurrences where those unique values appear in various fields or locations in the legacy data (block 504). The application stores the transformed form, e.g., triples formed from the count as in table 150 in FIG. 1A, into a value data structure (block 506).

The application selects an entry from the value data structure for analysis (block 508). The application determines whether the count of the occurrences of a unique value in that entry is below a count threshold (block 510). If the count of occurrences is below the count threshold ("Yes" path of block 510), the application determines whether a rule or a heuristic justifies identifying the value as aberrant for the field or location corresponding to the selected entry (block 511). If justified, e.g., when a condition of a rule or heuristic is satisfied by the value or the count ("Yes" path of block 511), the application identifies the value in the field or position corresponding to the entry as an aberration in the legacy data (block 512). The application proceeds to block 522 thereafter.

If the count of occurrences is not below the count threshold ("No" path of block 510), or if identification of the value or count as aberrant is not justified ("No" path of block 511), the application analyzes the value according to a set of rules, templates, or both (block 514). The application determines a type, form, or style of the value from the analysis of block 514 (block 516).

The application determines whether the type, form, or style determined in block 516 corresponds to the field or position where the value appears in the legacy data (block 518). If the type corresponds with the field or position ("Yes" path of block 518), the application proceeds to block 522. If the type does not correspond with the field or position where the value appears in the legacy data ("No" path of block 518), the application identifies the selected entry as indicating a re-purposed use of the corresponding field or position in the legacy data (block 520).

The application determines whether more entries in the value data structure are to be analyzed in a similar manner (block 522). If more entries remain to be analyzed ("Yes" path of block 522), the application returns to block 508. If not ("No" path of block 522), the application outputs a report of the identified values, counts, types, fields, positions, or a combination thereof, along with optional reasoning for identification (block 524). The application ends process 500 thereafter.

Figure 6:
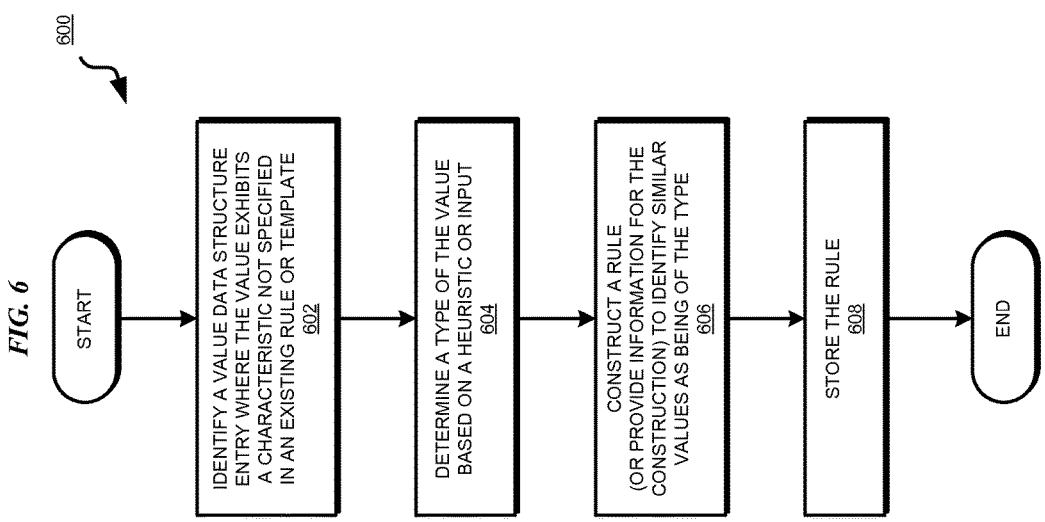
FIG. 6 depicts a flowchart of an example process for improving future analyses through machine learning in accordance with an illustrative embodiment.

With reference to FIG. 6, this figure depicts a flowchart of an example process for improving future analyses through machine learning in accordance with an illustrative embodiment. Process 600 can be implemented in application 402 in FIG. 4.

The application identifies an entry in a value data structure where the value exhibits a characteristic not specified in an existing rule or template (block 602). Using a heuristic or an input from a user, the application determines a type, form, or style of the value (block 604). The application constructs, or alternatively provides information sufficient for constructing, a rule to identify similar values as being of the type in future analysis of legacy data (block 606). The application stores the rule or the information therefor (block 608). The application ends process 600 thereafter.

Figure 7:
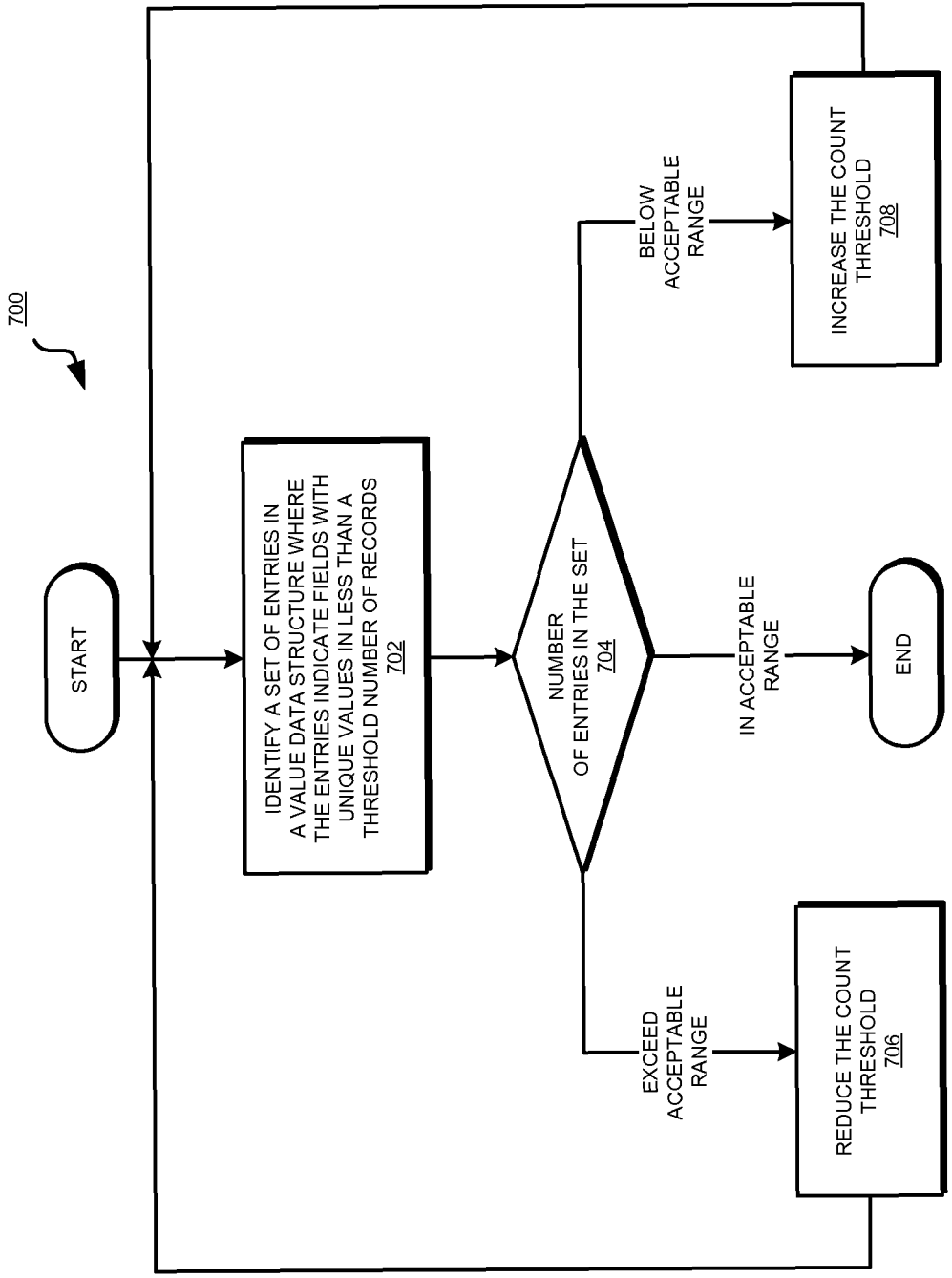
FIG. 7 depicts a flowchart of an example process for adjusting a count threshold for improving automated value analysis in legacy data in accordance with an illustrative embodiment.

With reference to FIG. 7, this figure depicts a flowchart of an example process for adjusting a count threshold for improving automated value analysis in legacy data in accordance with an illustrative embodiment. Process 700 can be implemented in application 402 in FIG. 4.

In a value data structure, the application identifies a set of entries where fields having a unique value in less than a threshold number of records are indicated (block 702). The application compares the number of selected entries of the value data structure with an acceptable range, where the acceptable range specifies one or more thresholds within which the number of identified entries should fall (block 704). In case of a single threshold, the comparison results in above, below, or at threshold outcome. In case of a range, the comparison results in above range, below range, or within range outcomes.

If the outcome of the comparison in block 704 is above the threshold or range ("Exceeds acceptable range" path of block 704), the application reduces the threshold and returns to block 702. If the outcome of the comparison in block 704 is below the threshold or range ("Below acceptable range" path of block 704), the application increases the threshold and returns to block 702. If the outcome of the comparison in block 704 is at the threshold or within acceptable range ("In acceptable range" path of block 704), the application ends thereafter. Reducing the count threshold causes identification of a comparatively smaller set of entries because presumably fields having a unique value in less than a (smaller) threshold number of records would also be comparatively fewer, and vice versa.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, a computer implemented method, system, and computer program product are provided in the illustrative embodiments for automated value analysis in legacy data.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage device(s) or computer readable media having computer readable program code embodied thereon.

Any combination of one or more computer readable storage device(s) or computer readable media may be utilized. The computer readable medium may be a computer readable storage medium. A computer readable storage device may be, for example, but not limited to, an electronic, magnetic, optical, electromagnetic, or semiconductor system, apparatus, or device, or any suitable combination of the foregoing. More specific examples (a non-exhaustive list) of the computer readable storage device would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible device or medium that can store a program for use by or in connection with an instruction execution system, apparatus, or device. The term "computer readable storage device," or variations thereof, does not encompass a signal propagation media such as a copper cable, optical fiber or wireless transmission media.

Program code embodied on a computer readable storage device or computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to one or more processors of one or more general purpose computers, special purpose computers, or other programmable data processing apparatuses to produce a machine, such that the instructions, which execute via the one or more processors of the computers or other programmable data processing apparatuses, create means for implementing the functions/acts specified in the flowchart and/or block diagram block or blocks.

These computer program instructions may also be stored in one or more computer readable storage devices or computer readable media that can direct one or more computers, one or more other programmable data processing apparatuses, or one or more other devices to function in a particular manner, such that the instructions stored in the one or more computer readable storage devices or computer readable medium produce an article of manufacture including instructions which implement the function/act specified in the flowchart and/or block diagram block or blocks.

The computer program instructions may also be loaded onto one or more computers, one or more other programmable data processing apparatuses, or one or more other devices to cause a series of operational steps to be performed on the one or more computers, one or more other programmable data processing apparatuses, or one or more other devices to produce a computer implemented process such that the instructions which execute on the one or more computers, one or more other programmable data processing apparatuses, or one or more other devices provide processes for implementing the functions/acts specified in the flowchart and/or block diagram block or blocks.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method comprising:
   transforming, using a processor and a memory, an existing data into a value data structure, the transforming comprising:
      counting a first number of occurrences of a first data pattern in a first field in the existing data, the first number of occurrences forming a first count, wherein the existing data comprises an unstructured document, and wherein the first field is a position in the unstructured document;
      determining a second count, the second count corresponding to a second number of occurrences of a second data pattern in the first field;
      computing, using the first count and the second count, a number of unique values occupying the first field in the existing data; and
      recording, as a first entry of a set of entries in the value data structure, a first identifier associated with the first field, the first data pattern, the first count, and the number of unique values occupying the first field;
   determining whether the number of unique values is below a threshold number of occurrences;
   responsive to determining that the number of unique values is not below the threshold:
      analyzing, using the processor and the memory, the first entry to determine a purpose for which the first field is configured, the purpose being specified by a set of templates such that the first pattern satisfy the purpose of the field when the first pattern fits a format of a template in the set of templates according to a rule, wherein different values can fit the format of the template according to the rule, and wherein the rule identifies acceptable values in the format of the template;
      analyzing the first entry to determine that the first field is actually used for a different purpose in the existing data other than an intended use of the first field in the existing data;
         wherein analysing the first entry to determine that the first field is used for a different purpose further includes:

determining a type of the first entry;
determining that the type of the first entry does not correspond with a field name where the first value appears in the existing data; and
reporting the different purpose as a re-purposed use of the first field of the existing data in a report; and
responsive to determining that the number of unique values is below the threshold:
analyzing the first entry to determine that the first field is an aberration in the existing data; and
reporting the first field as an aberration in the existing data in the report; and
selecting, from the value data structure, a subset of the set of entries, wherein each entry in the subset includes a field which has a less than the threshold number of occurrences of a value;
determining that a number of entries in the subset exceeds an acceptable range; and
reducing the threshold number of occurrences.

2. The method of claim 1, further comprising:
counting a third number of occurrences of a third data pattern in a second field in the existing data;
recording, as a second entry in a value data structure, a second identifier associated with the second field, the third data pattern, and the third count;
determining a type of the third value;
comparing the type of the third data pattern with a type of the second field;
reporting, in the report, responsive to the comparing indicating a mismatch, that the second field has been re-purposed for a use other than an intended use of the second field.

3. The method of claim 2, further comprising:
comparing the third data pattern to a template to determine whether a format of the third data pattern matches a format specified in the template.

4. The method of claim 2, wherein the type of the second field is inferable from a second identifier associated with the second field.

5. The method of claim 3, wherein the comparing is performed in combination with a rule.

6. The method of claim 1, further comprising:
making a determination according to a rule that the first count is below a threshold number and the second count exceeds the first count, the determination forming the aberration.

7. The method of claim 1, further comprising:
selecting, from the value data structure, a subset of the set of entries, wherein each entry in the subset includes a field which has a less than a threshold number of occurrences of a value;
determining that a number of entries in the subset is below an acceptable range; and
increasing the threshold number of occurrences.

8. A computer program product comprising one or more computer-readable storage devices and program instructions stored on at least one of the one or more computer-readable storage devices, the program instructions comprising:
program instructions to transform an existing data into a value data structure, comprising:
program instructions to count a first number of occurrences of a first data pattern in a first field in the existing data, the first number of occurrences forming a first count, wherein the existing data comprises an unstructured document, and wherein the first field is a position in the unstructured document;
program instructions to determine a second count, the second count corresponding to a second number of occurrences of a second data pattern in the first field;
program instructions to compute, using the first count and the second count, a number of unique values occupying the first field in the existing data; and
program instructions to record, as a first entry of a set of entries in the value data structure, a first identifier associated with the first field, the first data pattern, the first count, and the number of unique values occupying the first field;
program instructions to determine whether the number of unique values is below a threshold number of occurrences;
responsive to a determination that the number of unique values is not below the threshold:
program instructions to analyse the first entry to determine a purpose for which the first field is configured, the purpose being specified by a set of templates such that the first pattern satisfy the purpose of the field when the first pattern fits a format of a template in the set of templates according to a rule, wherein different values can fit the format of the template according to the rule, and wherein the rule identifies acceptable values in the format of the template;
program instructions to analyse the first entry to determine that the first field is actually used for a different purpose in the existing data other than an intended use of the first field in the existing data;
wherein the program instructions to analyse the first entry to determine that the first field is used for a different purpose further includes:
program instructions to determine a type of the first entry;
program instructions to determine that the type of the first entry does not correspond with a field name where the first value appears in the existing data; and
program instructions to report the different purpose as a re-purposed use of the first field of the existing data in a report; and
responsive to a determination that the number of unique values is below the threshold:
program instructions to analyze the first entry to determine that the first field is an aberration in the existing data; and
program instructions to report the first field as an aberration in the existing data in the report; and
program instructions to select, from the value data structure, a subset of the set of entries, wherein each entry in the subset includes a field which has a less than the threshold number of occurrences of a value;
program instructions to determine that a number of entries in the subset exceeds an acceptable range; and
program instructions to reduce the threshold number of occurrences.

9. The computer program product of claim 8, further comprising:
program instructions to count a third number of occurrences of a third data pattern in a second field in the existing data;
program instructions to record, as a second entry in a value data structure, a second identifier associated with the second field, the third data pattern, and the third count;

program instructions to determine a type of the third data pattern;

program instructions to compare the type of the third value with a type of the second field;

program instructions to report, in the report, responsive to the comparing indicating a mismatch, that the second field has been re-purposed for a use other than an intended use of the second field.

10. The computer program product of claim 9, further comprising:

program instructions to compare the third data pattern to a template to determine whether a format of the third data pattern matches a format specified in the template.

11. The computer program product of claim 9, wherein the type of the second field is inferable from a second identifier associated with the second field.

12. The computer program product of claim 10, wherein the program instructions to compare are performed in combination with a rule.

13. The computer program product of claim 8, further comprising:

program instructions to make a determination according to a rule that the first count is below a threshold number and the second count exceeds the first count, the determination forming the aberration.

14. A computer system comprising one or more processors, one or more computer-readable memories, one or more computer-readable storage devices, and program instructions, stored on at least one of the one or more storage devices for execution by at least one of the one or more processors via at least one of the one or more memories, the program instructions comprising:

program instructions to transform an existing data into a value data structure, comprising:

program instructions to count a first number of occurrences of a first data pattern in a first field in the existing data, the first number of occurrences forming a first count, wherein the existing data comprises an unstructured document, and wherein the first field is a position in the unstructured document;

program instructions to determine a second count, the second count corresponding to a second number of occurrences of a second data pattern in the first field;

program instructions to compute, using the first count and the second count, a number of unique values occupying the first field in the existing data; and program instructions to record, as a first entry of a set of entries in the value data structure, a first identifier associated with the first field, the first data pattern, the first count, and the number of unique values occupying the first field;

program instructions to determine whether the number of unique values is below a threshold number of occurrences;

responsive to a determination that the number of unique values is not below the threshold:

program instructions to analyse the first entry to determine a purpose for which the first field is configured, the purpose being specified by a set of templates such that the first pattern satisfy the purpose of the field when the first pattern fits a format of a template in the set of templates according to a rule, wherein different values can fit the format of the template according to the rule, and wherein the rule identifies acceptable values in the format of the template;

program instructions to analyse the first entry to determine that the first field is actually used for a different purpose in the existing data other than an intended use of the first field in the existing data;

wherein the program instructions to analyse the first entry to determine that the first field is used for a different purpose further includes:

program instructions to determine a type of the first entry;

program instructions to determine that the type of the first entry does not correspond with a field name where the first value appears in the existing data; and program instructions to report the different purpose as a re-purposed use of the first field of the existing data in a report; and responsive to a determination that the number of unique values is below the threshold:

program instructions to analyze the first entry to determine that the first field is an aberration in the existing data; and program instructions to report the first field as an aberration in the existing data in the report; and program instructions to select, from the value data structure, a subset of the set of entries, wherein each entry in the subset includes a field which has a less than the threshold number of occurrences of a value;

program instructions to determine that a number of entries in the subset exceeds an acceptable range; and program instructions to reduce the threshold number of occurrences.

* * * * *